United States Patent Office 2,967,607
Patented Jan. 10, 1961

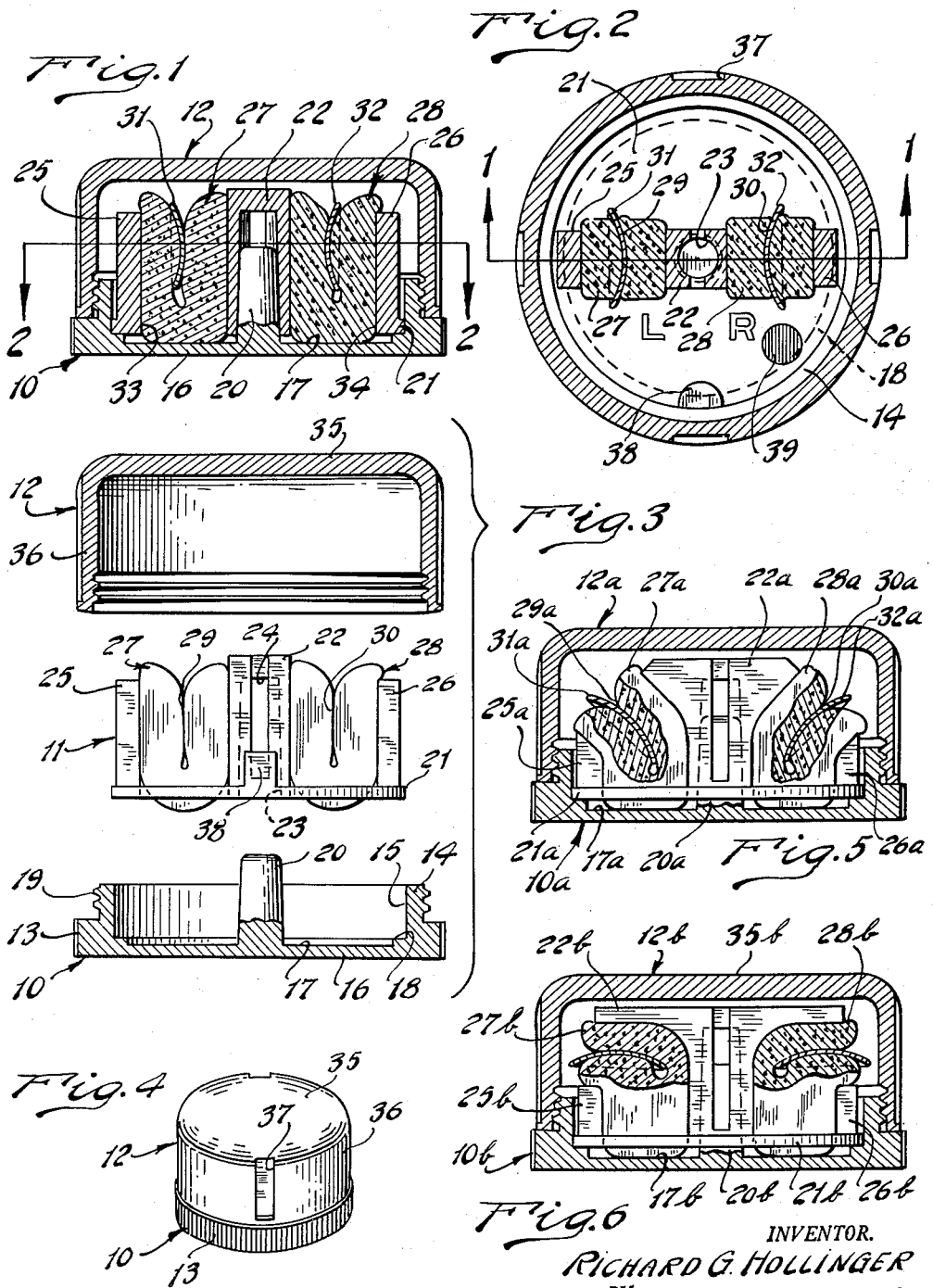

2,967,607

CONTACT LENS COMFORT CASE

Richard G. Hollinger, 10745 Kingston,
Huntington Woods, Mich.

Filed Mar. 16, 1960, Ser. No. 15,466

5 Claims. (Cl. 206—5)

This invention relates to a novel and improved contact lens carrying case which is adapted to maintain a moist film on the lenses when they are carried therein.

Contact lenses cannot be worn continuously and must be removed after a certain period of time to permit the user's eyes to be rested. During such periods the contact lenses must be kept wet so that eye fluid secretions thereon will not dry and cake on the lenses thereby reducing the efficiency of the lenses. Furthermore, most contact lenses are made from a plastic material which absorbs moisture while in use and, accordingly, the lenses should be kept in water or other suitable fluid when not in use. Therefore, it is the primary object of the present invention to provide a contact lens carrying case which is adapted to hold a pair of contact lenses in a liquid retaining soft material so as to maintain the surfaces of the lenses in a moist condition.

It is another object of the present invention to provide a contact lens carrying case which is water tight, shock resistant, simple and compact in construction, economical of manufacture, efficient in operation and small enough in size to be easily carried in a man's pocket or a woman's handbag.

It is a further object of the present invention to provide a contact lens carrying case constructed and arranged so that the lenses may be easily and positively inserted into a seating means without having the contact surfaces of the lenses touched by the user when they are put into or removed from the case.

It is still another object of the present invention to provide a contact lens carrying case which is provided with a pair of cushioned seats for retaining a pair of contact lenses in a moist condition and wherein the case is provided with a fluid chamber which is adapted to feed water or other suitable fluid to the cushioning members without spilling or leaking of the fluid.

Other objects, features and advantages of this invention will be apparent from the following detailed description and appended claims, reference being had to the accompanying drawing forming a part of the specification wherein like reference numerals designate corresponding parts of the several views.

In the drawing:

Fig. 1 is an elevational sectional view of a contact lens carrying case embodying the principles of the invention, taken along the line 1—1 thereof and looking in the direction of the arrows;

Fig. 2 is a horizontal sectional view of the structure illustrated in Fig. 1, taken along the line 2—2 thereof and looking in the direction of the arrows;

Fig. 3 is an exploded view, partly in section, of the structure illustrated in Fig. 1 and showing the relationship of the main parts of the case;

Fig. 4 is a perspective view of the contact lens carrying case of Figs. 1 through 3;

Fig. 5 is an elevational sectional view of a second embodiment of the invention; and, Fig. 6 is an elevational sectional view of a third embodiment of the invention.

Referring now to the drawing and in particular to Figs. 1 through 4 wherein is shown a first embodiment of the invention comprising a body member, a lens carrier means, and a cover, generally indicated by the numerals 10, 11 and 12. The body 10 is circular in cross section and is provided with the knurled periphery 13 as shown in Fig. 4. The body 10 further includes the annular side wall 14 which forms the storage chamber 15. The chamber 15 is enclosed by the lower end wall 16 which forms the fluid reservoir 17. A peripheral shoulder or step 18 is formed around the lower end of the chamber 15, and the lens carrier means 11 is adapted to be seated on this shoulder in a spaced relationship to the lower wall 16 to form the fluid chamber 17 therebetween. The body wall 14 is threaded on the outer side thereof as indicated by the numeral 19 for threaded engagement with the cover 12. The body member 10 further includes the centrally disposed integral vertical post 20 which is circular in cross section and adapted for holding the lens carrier means in place in the body member as more fully described hereinafter.

The lens carrier means 11 includes the round base plate 21 which has an outer diameter of a size so as to form a loose fit between the outer periphery thereof and the inner surface of the storage chamber 15. Integrally formed on the base plate 21 is the upwardly extended, centrally disposed square post 22 which is provided with the hole 23 which extends inwardly and upwardly through the plate 21 and to the plate 24 in the post 22. The post 20 on the body member 10 is adapted to be slidably received in the hole 23 with a friction fit therebetween so as to securely but releasably hold the lens carrier means 11 in the body member 10. If desired, the outer surface of the post 20 may be tapered so as to mate with a similarly tapered hole 23.

Laterally spaced from the lens carrier post 22 is a pair of upwardly extended legs 25 and 26 which are preferably integrally formed on the base plate 21 and which extend upwardly to a point near the upper end of the post 22. Mounted in each of the spaces between the legs 25 and 26 and the post 22 is a soft resilient liquid retaining cushion member as 27 and 28. The cushion members 27 and 28 may be made from any suitable soft porous material such as an open cell foam rubber or foam plastic, and they are fixed in place by any suitable means as by a suitable adhesive. The cushion members 27 and 28 are each provided with an elongated slit as 29 and 30, respectively, which extends inwardly from the upper end of the cushion material. A pair of contact lenses as 31 and 32 is adapted to be seated in the slits 29 and 30, respectively. As best shown in Fig. 1, the lower ends of the cushion members 27 and 28 extend downwardly through the holes 33 and 34 in the base plate 21 and into the fluid reservoir 17. It will be seen that fluid cannot escape from the chamber 17 if the fit between the lens carrier means 11 and the body 10 is a loose fit. It will be seen that the cushions 27 and 28 are continuously supplied with fluid from the chamber 17 by absorption therefrom, whereby the surface of the contact lenses will be maintained in a moist condition.

As shown in Figs. 1, 3 and 4, the cover 12 includes the upper end wall 35 and the annular integral side wall 36 which is provided with a suitable internal thread 37 for mating engagement with the thread 19 on the body member 10. The cover 12 may be provided with suitable finger gripping means as the vertically extended recesses 37.

As shown in Fig. 2, the base plate 21 of the lens carrier means 11 is provided with an upwardly extended projection 38 on one side thereof which is disposed on a radius line between the two cushion members 27 and 28. The member 38 acts as an indicator projection whereby the user of the carrier case will be able to position the lenses in the cushions 27 and 28 with the left lens disposed to the left of the projection 38 and the right lens disposed to the right of the projection 38. The user may thus always be able to remove a set of lenses from the carrier case and be able to tell which is the proper lens for each eye by merely turning the case until it is disposed in front of the user with the projection 38 in the same position in which it was disposed when the lenses were inserted into the holding means. As shown in Fig. 2, a red dot 39 is also marked on the side of the carrier plate 21 adjacent the cushion for holding a right eye lens. The cushions 27 and 28 are further marked with the capital eltters L and R which letters are shown in Fig. 2 as being stamped in the front face of the carrier plate 21 adjacent the respective cushions.

The contact lens carrying case of the present invention may be made from any suitable material such as a suitable plastic as plexiglass or a suitable lightweight metal. If a plastic material is used it may be colored as desired for ornamental purposes. The fluid compartment 17 is normally filled with a soaking solution so that the cushion members 27 and 28 are able to absorb the same and keep the lenses moist at all times.

Fig. 5 illustrates a second embodiment of the invention in which the lens cushion means 27a and 28a are disposed at an acute angle relative to the vertical axis through the central post 20a. In this embodiment the legs 25a and 26a are reduced in height and the head of the carrier post 22a is enlarged as shown in Fig. 5. The slits 29a and 30a are formed at an acute angle so as to hold the lenses 31a and 32a. The parts of this embodiment which are identical with the parts of the embodiment of Fig. 1 are marked with corresponding reference numerals followed by the small letter "a."

Fig. 6 illustrates a third embodiment of the invention in which the cushion members 27b and 28b are formed to have an exposed head parallel with the plane of the upper wall 35b of the cover 12b. The head of the carrier post 22b is extended outwardly to form an arm for engaging the upper ends of the cushion members. The legs 25b and 26b are reduced in height as shown in Fig. 6. The parts of this embodiment which are similar to the embodiment of Fig. 1 are marked with corresponding reference numerals followed by the small letter "b."

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A contact lens carrying case, comprising: a body closed at the lower end thereof and open at the upper end thereof; a lens carrier means releasably mounted in said body; a cover detachably mounted on the upper end of said body and enclosing the same with a water-tight connection; a fluid chamber formed in said body below said lens carrier; said lens carrier means including a pair of resilient absorbent cushion members, each of which is provided with a slit formed therein for the reception of a lens; and, said cushion members extending downwardly from the lens carrier means into said fluid chamber for contact with the fluid therein and absorption of the same.

2. A contact lens carrying case as defined in claim 1, wherein: said cushion members are disposed with the slits therein disposed normal to the plane of the body lower end wall.

3. A contact lens carrying case as defined in claim 1, wherein: said cushion members are disposed with the slits parallel to the plane of the body lower end wall.

4. A contact lens carrying case as defined in claim 1, wherein: said cushion members are disposed with the slits at an acute angle to the plane of the body lower end wall.

5. A contact lens carrying case as defined in claim 1, wherein: said lens carrier means is provided with means thereon for indicating the respective position of each of the lenses held thereon.

References Cited in the file of this patent

UNITED STATES PATENTS

| | | |
|---|---|---|
| 2,622,607 | Carlson | Dec. 23, 1952 |
| 2,944,661 | Goldstein | July 12, 1960 |